(12) United States Patent
Durieux et al.

(10) Patent No.: US 11,094,175 B2
(45) Date of Patent: *Aug. 17, 2021

(54) ADVANCED HARDWARE SYSTEM FOR SELF SERVICE CHECKOUT KIOSK

(71) Applicant: Clover Network, Inc., Sunnyvale, CA (US)

(72) Inventors: Vincent Durieux, Campbell, CA (US); Jacob Whitaker Abrams, San Mateo, CA (US); Nagalakshmi Rajagopal, Sunnyvale, CA (US)

(73) Assignee: CLOVER NETWORK, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,683

(22) Filed: Jun. 2, 2020

(65) Prior Publication Data
US 2021/0027586 A1     Jan. 28, 2021

Related U.S. Application Data

(63) Continuation of application No. 16/523,947, filed on Jul. 26, 2019, now Pat. No. 10,726,681.

(51) Int. Cl.
*G07G 1/00* (2006.01)
*G06K 7/14* (2006.01)
(Continued)

(52) U.S. Cl.
CPC ......... *G07G 1/0045* (2013.01); *G06F 3/0416* (2013.01); *G06F 3/1423* (2013.01);
(Continued)

(58) Field of Classification Search
CPC ........ G06Q 20/20; G06Q 20/38; G06Q 30/00; G06Q 20/00
(Continued)

(56) References Cited

U.S. PATENT DOCUMENTS 9,513,756 B1 * 12/2016 Mishra ................. H04B 5/0031
9,704,355 B2 *  7/2017 Beatty ................. G06Q 20/202
(Continued)

OTHER PUBLICATIONS

Nonfinal Office Action dated Dec. 31, 2019 from U.S. Appl. No. 16/523,947, 13 pages.
(Continued)

*Primary Examiner* — Olusegun Goyea
(74) *Attorney, Agent, or Firm* — Foley & Lardner LLP

(57) ABSTRACT

Methods and systems for providing an advanced hardware system for a self-service kiosk are disclosed herein. In specific embodiments of the invention, a payment interface device is provided. The device includes an integrated touch display, a means for receiving payment information, and a casing holding the integrated touch display and the means for receiving payment information. The device also includes an applications microprocessor and a secure microprocessor located within the casing. The applications microprocessor instantiates an operating system and stores instructions for execution by the operating system for operative communication with a peripheral bar code scanner and a peripheral display. The secure microprocessor stores instructions to encrypt payment information for the system and is in operative communication with the means for receiving payment information.

24 Claims, 4 Drawing Sheets

(51) Int. Cl.
*G06F 3/14* (2006.01)
*G06Q 20/20* (2012.01)
*G06F 3/041* (2006.01)

(52) U.S. Cl.
CPC ......... *G06K 7/1413* (2013.01); *G06Q 20/204* (2013.01); *G06Q 20/208* (2013.01)

(58) Field of Classification Search
USPC .......................... 705/14.21, 14.26, 21, 14.38
See application file for complete search history.

(56) References Cited

U.S. PATENT DOCUMENTS

| | | | | |
|---|---|---|---|---|
| 9,792,783 | B1* | 10/2017 | Beatty | G06Q 20/206 |
| 10,140,612 | B1* | 11/2018 | Murray | H04L 9/002 |
| 10,326,797 | B1* | 6/2019 | Murray | G06Q 20/3227 |
| 2012/0166267 | A1* | 6/2012 | Beatty | G06Q 30/0219 705/14.21 |
| 2016/0005020 | A1 | 1/2016 | Fernando et al. | |
| 2017/0309135 | A1* | 10/2017 | Beatty | G06Q 20/202 |
| 2018/0033255 | A1* | 2/2018 | Beatty | G06Q 20/202 |

OTHER PUBLICATIONS

Notice of Allowance dated Apr. 20, 2020 from U.S. Appl. No. 16/523,947, 26 pages.
Extended European Search Report dated Jan. 13, 2021 from European Application No. 20187626.5, 7 pages.

* cited by examiner

ADVANCED HARDWARE SYSTEM FOR SELF SERVICE CHECKOUT KIOSK

CROSS REFERENCE TO RELATED APPLICATION

This application is a continuation of U.S. patent application Ser. No. 16/523,947, filed Jul. 26, 2019, which is incorporated by reference herein in its entirety for all purposes.

BACKGROUND

Self-service checkout kiosks allow stores to reduce their human resource requirements and free up employees for alternative tasks. FIG. 1 provides an illustration of the standard components of a self-service kiosk 100. FIG. 1 includes a display 101, a scanner cabinet 102, a payment interface device 103, a bagging area 104, and a computer 105. Scanner cabinet 102 includes a bar code scanner 106 that can be used to scan items. When the items are scanned, the price and an identifier for the item can be provided on display 101. In some approaches, bagging area 104 includes a scale to determine when the scanned item has been placed in the bag, and to determine if an item was added to the bag without being scanned. After a customer has scanned all their items, they can be instructed, as illustrated, to complete the payment portion of the transaction using payment interface device 103. This process could involve providing a card 107 to a card reader on payment interface device 103.

Self-service kiosk 100 includes an additional display 101 because the display on payment interface device 103 may be too small to allow a user to inspect the characteristics of the current transaction, such as the list of items that have already been scanned and their associated prices. Also, in some implementations, the payment interface device 103 will be a simple card reader and mechanical keypad with only a rudimentary display.

Payment interface devices such as payment interface device 103 will often be basic peripheral devices intended for use with a merchant facing payment interface device with a fully functional touch display. However, there is no merchant in the self-service kiosk payment flow. As such, it would not make sense to introduce a full merchant facing payment interface device to provide information to display 101. Furthermore, doing so could expose the merchant's systems to peripherals that are readily accessible to customers and are hence less secure. The common solution for this issue is the use of a computer 105 to run an application that will display required information to display 101. The computer 105 is often a standard personal computer running a Windows operating system. Such a computer is used because it is generally less expensive than a device that has been optimized for Payment Card Industry (PCI) compliance and the treatment of sensitive payment information. Using this approach, payment interface device 103 can be kept in a separate logical hierarchy from control by computer 105 which assists in maintaining the PCI compliance of the system. However, computer 105 still adds to the cost of the system and it takes up valuable space and power in a merchant's establishment.

SUMMARY

Methods and systems for providing an advanced hardware system for a self-service kiosk are disclosed herein. Specific embodiments disclosed herein involve a payment interface device that has a device footprint akin to that of a standard card reader but that serves, not as a peripheral, but as the main hub for a self-service checkout kiosk. These approaches are facilitated by a device architecture that essentially moves the workload of a separate kiosk computer into the payment interface device itself, while at the same time maintaining isolation between payment processing and the customer-facing peripherals of the kiosk. The resulting payment interface device is therefore able to obviate the need for an additional computer, such as computer 105, to run the main display of the kiosk and any other peripheral elements such as bar code scanners, scales, and receipt printers required for the kiosk to function. Furthermore, the combined kiosk requires fewer power connections and network connections and no connection between a payment device and a general computer. As a result, the system exhibits benefits not only in terms of reduced cost and space consumption, but is also generally more reliable and easier to setup than traditional systems.

In specific embodiments of the invention, a device is provided. The device can be a payment interface device. The device comprises an integrated touch display, a means for receiving payment information, and a casing holding the integrated touch display and the means for receiving payment information. The device can be a payment interface device in that it includes the ability to receive payment information, encrypt the received payment information, and transmit the encrypted information to a POS network to seek approval for a payment transaction. The device also comprises an applications microprocessor and a secure microprocessor located within the casing. The applications microprocessor instantiates an operating system and stores instructions for execution by the operating system for operative communication with a peripheral bar code scanner and a peripheral display. The secure microprocessor stores instructions to encrypt payment information for the system and is in operative communication with the means for receiving payment information. In specific embodiments of the invention, a system is provided comprising such a device, the peripheral display, and the peripheral bar code scanner.

As used herein, a means for receiving payment information refers to a device that can accept payment information from a user that is present and physically providing that information to the system. Means for receiving payment information include key pads for receiving PINs, bar code scanners (including QR code scanners), magnetic stripe readers (MSRs) for reading magnetically encoded account numbers, near field communication (NFC) readers for contactless payment processing, finger print readers, infrared surface or gesture analyzers, chip card readers, microphones for receiving auditory information, and any devices known in the industry for receiving payment information from a user appearing in person. Payment information includes account numbers, personal identification numbers (PINs), biometric information, passwords, or any other information that is used by a payment processor to authorize the transfer of funds from one entity to another. Common examples of payment information include 16-digit credit card numbers for credit card transactions and 4-digit PINs for debit card transactions.

DETAILED DESCRIPTION

Advanced hardware systems for a self-service kiosk in accordance with the summary above are disclosed herein. The methods and systems disclosed in this section are nonlimiting embodiments of the invention, are provided for explanatory purposes only, and should not be used to constrict the full scope of the invention.

Figure 1:
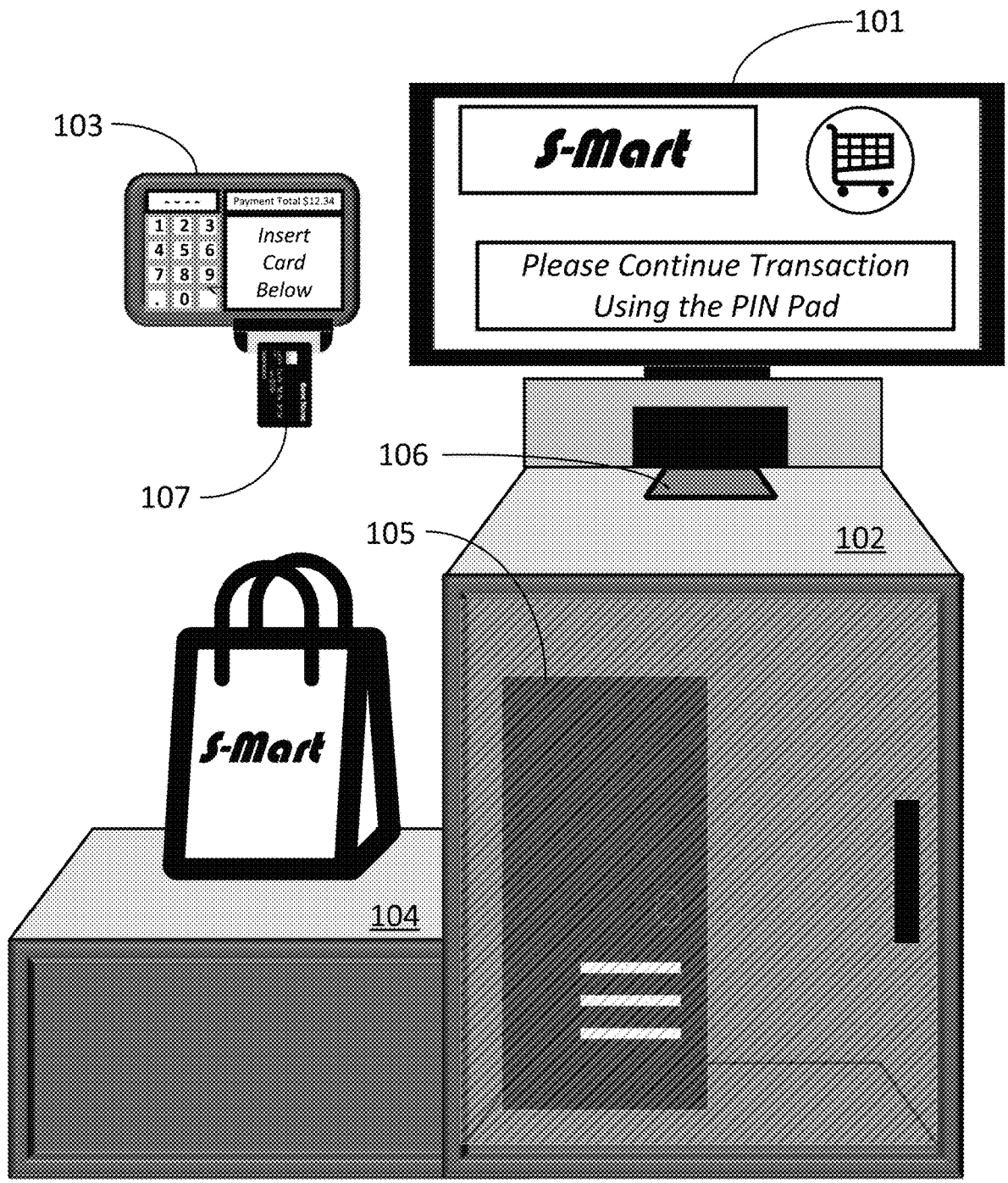
FIG. 1 illustrates a self-service checkout kiosk in accordance with the related art.
Figure 2:
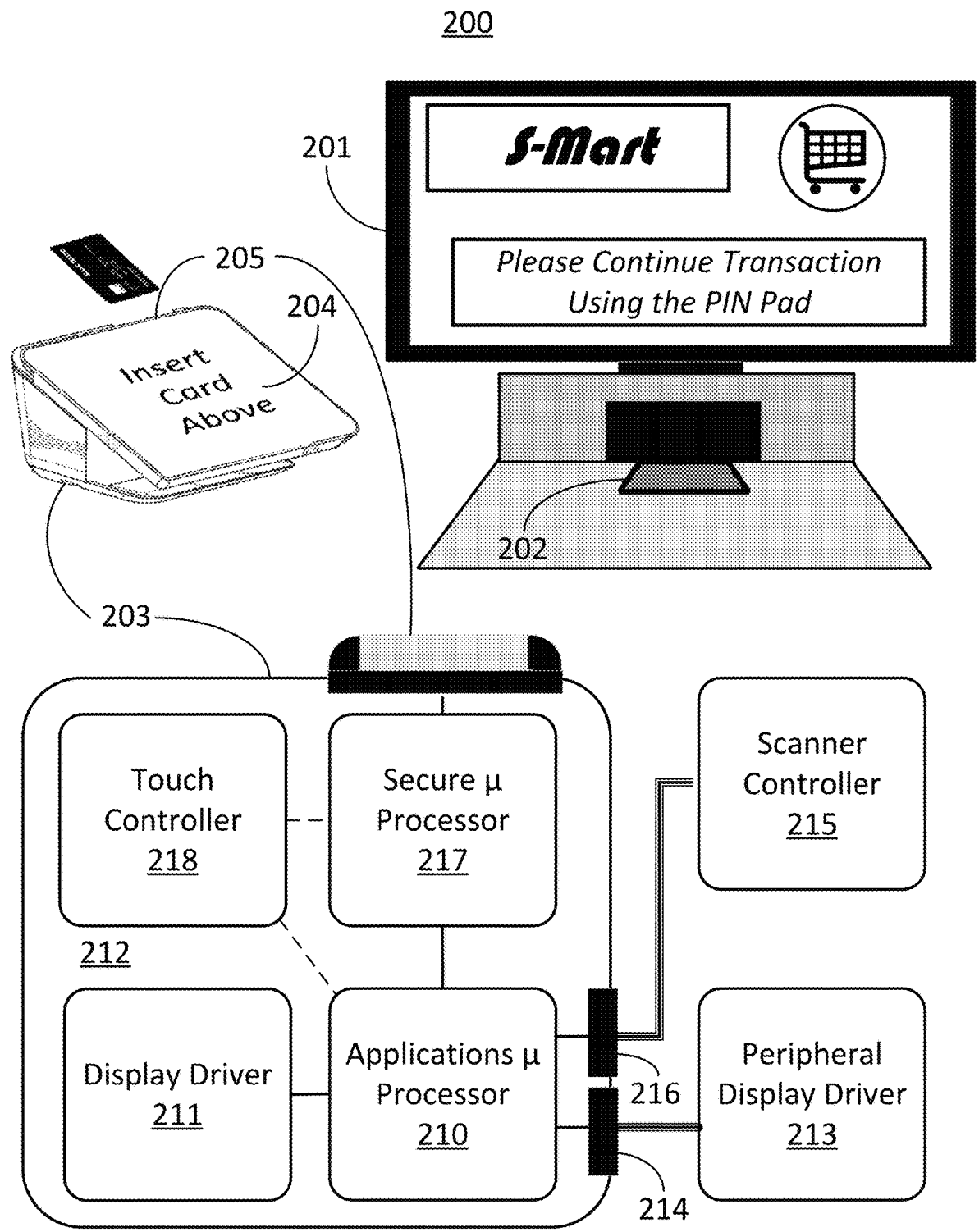
FIG. 2 illustrates a self-service checkout kiosk using a payment interface device that is in accordance with specific embodiments of the invention disclosed herein.

In specific embodiments of the invention, an advanced self-service kiosk system is provided. The self-service kiosk system can include a payment interface device with an integrated means for receiving payment information, which can be used to settle a transaction, and one or more peripherals for facilitating interaction with a user in order to enable the user to create a purchase order for that transaction. The payment interface device can be configured to administrate the aforementioned peripherals. The payment interface device can accordingly serve as the sole master computation platform for the self-service kiosk. The payment interface device can connect to the one or more peripherals for this purpose via communication ports on the payment interface device including ports for wired or wireless communication. FIG. 2 illustrates a system 200 that serves as a nonlimiting embodiment of such a self-service kiosk system.

The peripherals of the self-service kiosk system can take on numerous forms depending upon the requirements of a given application. For example, if the kiosk were used to create a purchase order for groceries in a grocery store, the peripheral could include a standard LCD display, a scale, and a barcode scanner for building the purchase order. In these embodiments, the payment interface device could be configured to provide information to the display and receive information from the scanner and scale in order to walk the user through the creation of the purchase order for the transaction. In specific embodiments, the same standard LCD could be replaced by a touch display in order to receive inputs from the user via the display as well as the scanner. As another example, if the kiosk were being used to create a purchase order for a transit ticket, the peripherals could be limited to a touch display and speaker. In the example of FIG. 2, the peripherals include a large peripheral touch display 201 and a peripheral bar code scanner 202. The peripherals can include additional elements such as scales, hand-held or countertop bar code scanners, cameras, antennas for short range communication such as NFC antennas, and any elements used to track, identify, or characterize items for a purchase order. The peripherals can include any form of user interface for either providing information to or obtaining information from a customer to aid the customer in creating a purchase order such as microphones, speakers, displays, touch pads, mice, keyboards, key pads, biometric readers, wireless card readers such as NFC readers, and other peripherals.

In specific embodiments of the invention, the payment interface device will also be configured to administrate additional peripherals associated with alternative portions of the transaction, besides the creation of the purchase order. The payment interface device can have numerous ports for connecting with and administrating these additional peripherals. The additional peripherals can include receipt printers, alternative devices with means for receiving payment information, additional displays, external memories, and any other peripheral used in the industry.

The payment interface device can include various elements depending upon the requirements of a given application. The payment interface device can include a secure microprocessor and a separate and discrete applications microprocessor as will be described in more detail below. The applications microprocessor and/or secure microprocessor could be located on a motherboard within a casing of the payment interface device. The secure microprocessor could be located within a tamper mesh within the casing of the payment interface device. The payment interface device can have various communication ports such as exterior USB, UART, I2C, Lightning, Thunderbolt, Ethernet, or other communication protocol ports as well as internal or external antennas to serve as wireless communication ports. The payment interface device could have a wired communication protocol driver or wireless radio for communicating with a POS network for purposes of transmitting encrypted payment information and receiving payment approvals. The payment interface device can use the same or different wired or wireless connections to communicate with the peripheral devices mentioned herein. The payment interface device can include various means for accepting payment information. The payment interface device can also include additional user interface elements such as speakers, microphones, displays, touch displays, gesture recognition devices, and other user interface elements known in the industry. In FIG. 2, payment interface device 203 is connected to peripheral bar code scanner 202 using a USB wire and display 201 using an HDMI wire where both wires are routed underneath the shared countertop on which the items are placed and hence they are not visible in the drawing.

In specific embodiments of the invention, the payment interface device will include one or more computer readable memories storing instructions to conduct various actions as disclosed herein. The instructions can include instructions for administrating the peripherals, accepting payment information, encrypting payment information, transmitting payment information, receiving an approval for a transaction, displaying a payment flow, displaying a purchase order creation flow, and any number of other functions. The memories could be volatile or nonvolatile and can include read only memory (ROM) and random access memory (RAM). The memories can be located on an applications microprocessor, a secure microprocessor, on external memory devices on a printed circuit board, or distributed across the architecture of the payment interface device.

The payment interface device can take on various forms depending upon the requirements of a given application. The payment interface device can include all its various elements within a single discrete device. For example, the element of the payment interface device could all be integrated with the device, attached to a common frame, enclosed or framed by a common casing, or otherwise configured as a single discrete unit. The elements described above such as the means for receiving payment information, ports, and display can be integrated elements of the payment interface device in that they are secured in place to a frame of the payment interface device, encased within a casing of the payment interface device, or otherwise set relative to a body of the payment interface device. The payment interface device can be configured to attach to a vertical surface such as the back panel of a kiosk or other vertical surface of a kiosk. The payment interface device can be configured as a countertop device. In specific embodiments, the same payment interface device could be configured for vertical mounting or for countertop use. The payment interface device could be placed on a rotating stand to allow a user to adjust the angle at which the user interface elements of the payment interface device were displayed.

In specific embodiments of the invention, the payment interface device will be a small footprint device. The payment interface device can be approximately the size of a standard keypad and card reader device as is used in self-service kiosks systems generally. In specific embodiments of the invention, the payment interface device can be a countertop device with a countertop form factor. The payment interface device can have a top down footprint of less than one square foot of counter space to reduce the overall footprint of the self-service kiosk by replacing a large separate computer with internal components to a device that is already required by the kiosk.

Specific examples of a payment interface device that can be used in accordance with specific embodiments of the invention include a discrete device with an integrated physical keypad and means for receiving payment information in the form of a chip card reader and MSR. The discrete device could include a simple display for information such as a total amount to be charged etc. but would lack a touch screen or more sophisticated user interface element. However, such a device could include a microprocessor for administrating a peripheral touch display via an external communicative connection. As such, the device might appear to be a peripheral of the kiosk but would serve as the main compute platform.

Payment interface devices with various combinations of elements and form factors disclosed above can be used in combination with specific embodiments of the systems disclosed herein. Furthermore, specific payment interface devices in accordance with this disclosure can be used in various kiosk systems that are in accordance with this disclosure. For example, FIG. 2 provides the example of a payment interface device 203 with an integrated touch display 204 and payment card reader 205. In the illustrated system, payment interface device 203 is being used with a large peripheral display 201 that can present information to the user to allow them to generate a purchase order for a transaction and a bar code scanner 202 that can allow the user to scan items in for the purchase order. As such, the integrated display 204 may only be required when the user is conducting the payment flow process of the transaction. However, the same payment interface device 203 shown in FIG. 2 is also, due to its integrated display 204, capable of serving as a standalone POS terminal for a self-service kiosk. For example, display 201 could be removed from the system, and the purchase order could be generated by a user scanning items using scanner 202 and reviewing the purchase order using integrated touch display 204.

In specific embodiments, the payment interface device includes an applications processor located within a casing of the payment interface device. The applications processor can be the processor of an applications microprocessor located on a printed circuit board in the casing. The applications microprocessor can instantiate an operating system for the kiosk and store instructions for controlling the peripherals of the kiosk, such as a peripheral display, via communication ports on the device. For example, the operating system can communicate with a peripheral display via a port on the device and a peripheral display port on the peripheral device. That applications microprocessor can be in operative communication with the peripherals of the system. The applications microprocessor can additionally store instructions for controlling the integrated elements of the payment interface device such as an integrated radio, router, display, touch display, or other user interface elements. The operating system can control the peripherals of the kiosk. The operating system can control these peripherals via communicative connections comprising pins on the applications microprocessor, routing internal to the payment interface device, and external wired or wireless connections between the payment interface device and the peripherals. The operating system can control the integrated elements of the payment interface devices. The operating system can control these elements via communicative connections comprising pins on the applications microprocessor and routing internal to the payment interface device. The operating system can control the integrated devices and peripherals using discrete controllers that are specific to those elements such as touch display controllers, display drivers, etc.

The instructions stored on the payment interface device can be executed using the operating system. The instructions can include instructions to administrate the peripherals of the kiosk and any integrated elements of the payment interface device. For example, the instructions could include instructions to identify an item using information from a peripheral scanner, display an item on the peripheral display, display a set of purchase order flow user interface screens on the peripheral display, and display a set of payment flow user interface screens on an integrated touch display of the POS terminal. Displaying the item could include displaying an image of the item, a text description of the item, or any other item identification. The payment flow screens can allow a user to identify a means for providing payment information they would like to use for conducting a transaction, display the total of the purchase order to the user, obtain confirmation from the user to process the transaction, and present an approval or declining message to the user to inform them of the outcome of the transaction. The payment flow screens can include other elements such as user interface element for printing receipts, adding a tip, cancelling the transaction, and any other elements known in the art. The purchase order flow screens can allow a user to identify items for purchase or review items added to the purchase order using other peripherals such as scales or bar code readers. The purchase order flow screens can include other elements such as user interface elements for identifying quantities of items or services, selecting a specific item from a digital display of available items or services, and any other elements known in the art.

FIG. 2 provides an illustration of the internal components of payment interface device 203. Including applications microprocessor 210. As illustrated, applications microprocessor 210 is in operative communication with a display driver 211. The display driver can be the driver for integrated touch display 204. The display driver 211 can be an integrated component of applications microprocessor 210 or a separate element. As illustrated, applications microprocessor 210 is connected to display driver 211 using an external pin and traces on a PCB 212 of payment interface device 203. Applications microprocessor 210 is likewise in operative communication with peripheral display driver 213 via an external pin, traces on PCB 212, a communications port 214, and an external wire. The peripheral display driver 213 can be an internal component of display 201. Applications microprocessor 210 is likewise in operative communication with peripheral scanner controller 215 via an external pin, traces on PCB 212, a communications port 216, and an external wire. The scanner controller can be an internal component of peripheral scanner 202.

In specific embodiments, the payment interface device includes a secure processor located within a casing of the payment interface device. The secure processor can be an additional element located on the payment interface device that is logically separate and isolated from the applications processor mentioned above. In specific embodiments, the secure processor can also be physically isolated from the applications processor. The secure processor can be the processor of a secure microprocessor located on a printed circuit board in the casing. The same printed circuit board can include an applications microprocessor as described above. The applications microprocessor can include a secure memory for storing cryptographic keys and encrypting payment information. The secure microprocessor can be directly connected to the means for receiving payment information that are integrated with the payment interface device. For example, the secure microprocessor could have a pin connected to a trace internal to the casing of the payment interface device that connected to a magnetic stripe reader (MSR) or chip card reader. As another example, the secure microprocessor could be directly connected to a touch controller of the payment interface device. As such, the secure microprocessor could receive the touch coordinates of a PIN number entered on a touch display of the payment interface device. The payment interface device could be configured to detect when the kiosk was placed in a condition for receiving such a PIN and switch the connection of the touch controller from an applications microprocessor to the secure microprocessor upon detecting that condition.

The secure microprocessor can include various cryptographic and otherwise sensitive information stored in secure memories. The secure memories can be integral components of the secure microprocessor such as embedded flash memory or integrated ROM memory. The secure memories can store payment keys for encrypting payment information received by the means for receiving payment information. The payment key could be a single payment key in a set of payment keys stored by the first discrete device. The payment keys could also be a key set for a Derived Unique Key Per Transaction (DUKPT) key management scheme as specified in ANSI X9.24 part 1. The payment keys, or derivatives thereof, could be utilized by the POS system to encrypt payment information received by the POS system for transmission in encrypted form to a payment processor.

The secure memories of the secure microprocessor can be used to store data used in the execution of the methods disclosed herein as well as computer executable instructions necessary to enable a processor to carry out the methods disclosed herein. The secure memories can be used to store the payment keys that are distributed through the system. The secure memories can take on various forms. They can be integrated with the secure processor and include ROM, EPROM, or $E^2$PROM memories integrated with the secure processors. For example, the secure memories could be a combination of ROM and embedded flash memory. The secure memories could store instructions for executing encryption algorithms that are meant for execution by a secure processor to perform the methods disclosed herein. Furthermore, the secure memories could comprise multiple components such as memory integrated on the secure processors as well as separate memories accessible to, but not integrated with the secure processors. The secure memories could be part of a memory system on each device that likewise included numerous physical components. The payment interface device could also include a backup battery that is specifically responsible for maintaining power to secure components associated with the secure processor that require constant power such as tamper sensors and any volatile memory that stores injected payment keys.

Returning to FIG. 2, secure microprocessor 217 is illustrated as being in operative communication with card reader 205 and applications microprocessor 210. As illustrated, secure microprocessor 217 is an element on PCB 212 and all the operative communication links with secure microprocessor 217 can be via pins of the microprocessor and traces and routing internal to the casing of payment interface device 203. Both secure microprocessor 217 and applications microprocessor 210 can be connected to touch controller 218. The payment interface device can be configured such that the communicative connection between secure microprocessor 217 and touch controller 218 does not include applications microprocessor 210. For example, the payment interface device can be configured such that all touch data from the touch controller is first routed to the secure microprocessor and is only routed onward to applications microprocessor if it is determined that the touch controller is not being used to provide payment information to the payment interface device. As another example, the payment interface device can be configured to change a routing state for the touch data between being routed to the applications microprocessor and the secure microprocessor based on a detected mode in which the payment interface device was operating. Data could be routed directly to the applications microprocessor in an unsecure mode and to the secure microprocessor in a secure mode. For example, the payment interface device could store instructions to display a PIN pad on the touch display and alter a mode of the system to directly route touch coordinates from the touch display to the secure microprocessor when the PIN pad is displayed. The instructions could be executed by both the secure microprocessor and the applications processor, but the state of the system as existing between these two modes could ultimately be controlled by the secure microprocessor such that, for example, the applications microprocessor could not display a PIN pad on the touch display unless the device was in the secure mode and routing touch coordinates directly to the secure microprocessor.

In specific embodiments of the invention in which the payment interface device includes an operating system that controls an integrated display and a peripheral display, the operating system can be augmented to control both displays simultaneously and otherwise administrate the provisioning of purchase order flows and payment flows between the two displays. The operating system can control both flows via a single application instantiated on the operating system such as a register module or check out module. However, the operating system could control both flows via separate modules that interoperate via the communication infrastructure provided by the operating system. The operating system can control the integrated display of the payment interface device using a first display object instantiated by the operating system and control the peripheral display using a second display object instantiated by the operating system. The operating system could then associate those display objects with different portions of the hardware abstraction layer (HAL) of the operating system for the integrated display and the peripheral display. For example, a PIN pad user interface element can be provided on the integrated display by assigning it to the display object associated with the HAL element for that display. Providing different screens to each display would thereby involve assign statements directed to those display objects. In specific embodiments of the invention the operating system is an Android operating system. In these specific embodiments, the peripheral display could be controlled using an associated display object and the assignment of a Presentation dialog to that display object. The Presentation dialog could then be used to display aspects of the purchase order flow such as item information for items being added to the purchase order.

Figure 3:
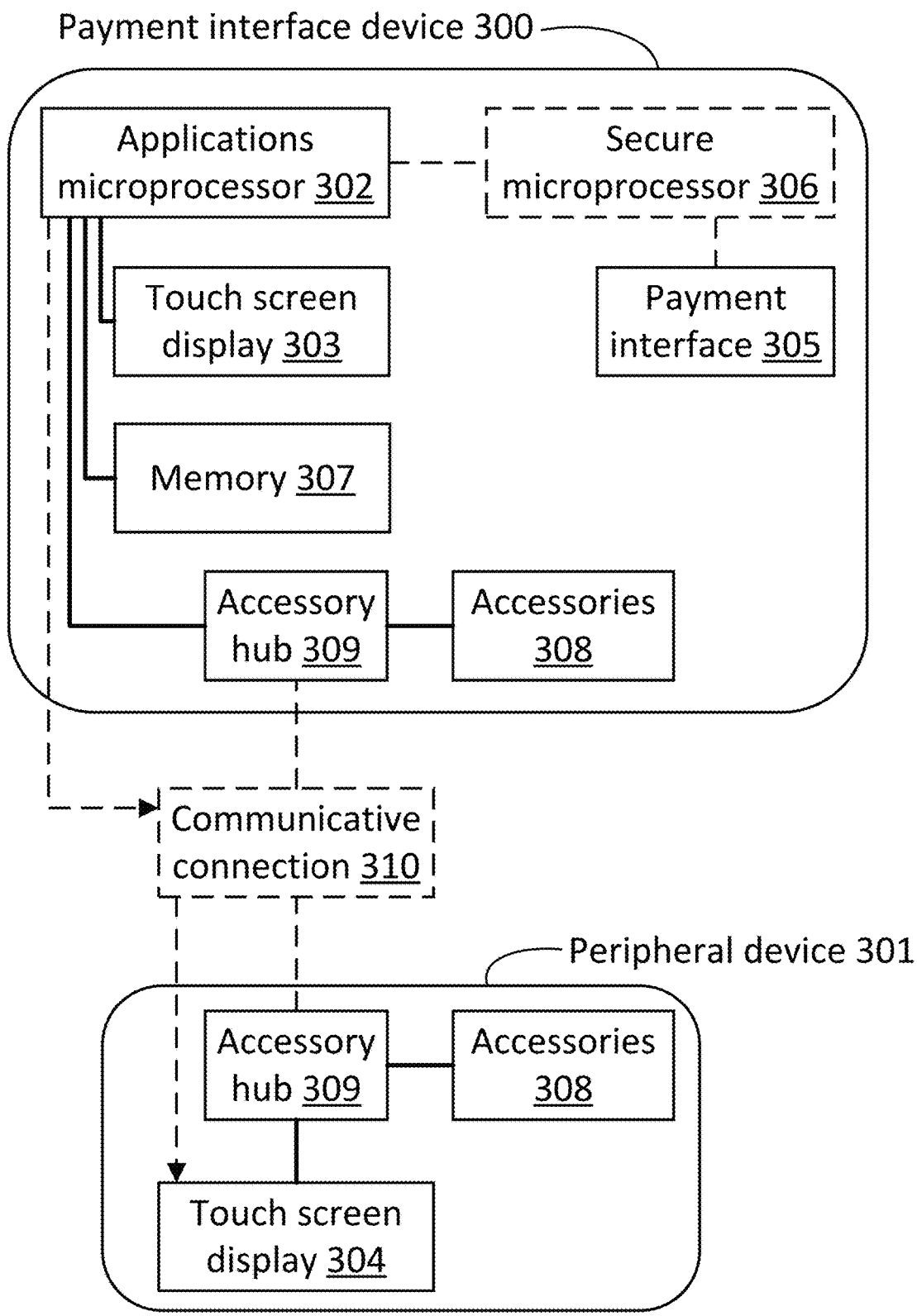
FIG. 3 illustrates a block diagram of a payment interface device operating in combination with a peripheral display in accordance with specific embodiments of the invention disclosed herein.

FIG. 3 illustrates a block diagram for a hardware configuration scheme that represents an embodiment of the systems and methods disclosed herein. FIG. 3 includes a payment interface device 300 and a peripheral device 301. In this figure, solid and dotted lines that connect two blocks indicate a direct and two-way communicative connection between those blocks, and blocks with dotted outlines indicate optional variations of the illustrated system. Lines with arrow heads indicate one-way communication between the blocks in the direction of the arrows.

In one embodiment, the payment interface device 300 can include an applications microprocessor 302 that can instantiate an operating system. As illustrated, the peripheral device 301 does not include a microprocessor. The operating system can be any type of operating system commonly used in the mobile devices, such as iOS, Android, Android Go, Tizen, BlackBerry, Windows Mobile, and other operating systems. In this embodiment, the operating system can control both: one system interface displayed on the payment interface device 300 touch screen display 303; and another system interface displayed on the peripheral device 301 touch screen display 304; wherein the system interfaces can operate as self-service kiosk interfaces as described above.

In one example where the Android operating system can be utilized for controlling the displays 303 and 304, the operating system can leverage native applications, such as those available in Android, version 7.0 "Nougat" and later, or third-party applications, such as the multi-window functionality in the Samsung Galaxy series mobile devices, to enable the applications microprocessor 302 to implement system interfaces across multiple displays. In one example, the applications microprocessor 302 can be a Qualcomm Snapdragon series microprocessor, or another mobile device processor commonly used for managing multiple displays. The touch screen displays 303 and 304 can optionally be augmented with other types of displays, such as those that do not have touch screen capability, including LED, LCD, e-paper, and other display types, and can optionally have connected data input devices, such as key pads, key boards, PIN pads, or other data input devices to augment the input of information by the users of the devices.

In one embodiment, the payment interface device 300 can have a payment interface 305. The payment interface can receive payment information as input, which includes account numbers, PINs, biometric information, passwords, or any other information that is used by a payment processor to authorize the transfer of funds from one entity to another. Common examples of payment information include 16-digit credit card numbers for credit card transactions and 4-digit PINs for debit card transactions. In one example, the payment interface device 300 can optionally include a secure microprocessor 306 to process payment information in a cryptographically secure manner. The devices can also include injected payment keys that are used to encrypt payment information for transfer to a payment processor. In embodiments where a secure microprocessor 306 is present and connected to the applications microprocessor 302, the connection is configured such that in cases where secure information, such as payment information, is unencrypted, it cannot be communicated from the secure microprocessor 306 to the applications microprocessor 302.

In some embodiments, the payment interface device 300 can include an electronic memory 307 to store data, programs, and applications for the applications microprocessor 302 to process, including operating systems and interface systems. In one example, the memory 307 can be a volatile memory device such as dynamic random access memory, static random access memory, or other types of volatile memory commonly used in mobile devices. In another example, the memory 307 can be a non-volatile memory device such as solid state hard disk, mechanically rotating hard disk, an optical disc, or other type of non-volatile memory commonly used in the industry.

In some embodiments, the payment interface device 300 and peripheral device 301 can include accessories 308 which add various types of functionality to the devices installed thereon. The accessories 308 of the payment interface device 300 and the peripheral device 301 can be the same, can have some in common and others specific to only one device or the other, or they comprise different groups of accessories with no overlapping form or function. Examples of accessories commonly used in payment interface devices and display devices include image sensors, microphone devices, audio speakers, thumb print readers, mouse touchpads, and modems configured with wireless radios that can act as a transceiver for wireless communications of any standard type or frequency band, including such standards as the Wi-Fi/IEEE 802.11 series, EDGE, the EV-Do series, Flash-ODFM, GPRS, the HSPA standards, Lorawan, LTE, RTT, the UMTS series, WiMAX, 6LoWPAN, the Bluetooth series, IEEE 802.15.4-2006, Thread, UWB, Wireless USB, ZigBee, ANT+, and other standards.

In some embodiments, the accessories 308 can be connected to an accessory hub 309. In one example, the payment interface device 300 can have an accessory hub 309 and accessories 308, in which the accessories 308 are connected to the accessory hub 309, which is further connected to the applications microprocessor 302. In this example, the connections can be communicative connections and the applications microprocessor 302 can send information and individual instructions to the accessories 308 for their operation, such as a command to take a picture with an image sensor, as well as receive information from the accessories 308, such as receiving the picture taken with the image sensor to store in the memory 307. On the peripheral device 301, accessories 308 can interact with an accessory hub 309 using the same configurations and methods described for the payment interface device 300.

In some embodiments, the accessory hub 309 can have permanent connections to internal components such as accessories 308, as well as non-permanent connections to devices external to the device on which the accessory hub 309 is installed. In a first example, a non-permanent, optional, external connection can be constructed between the payment interface device 300, or the peripheral device 301, and other devices using electrical data cables with end connectors chosen by the standard associated with the data cable type. In this example, the data cable type can be any type, and the accessory hub 309 can have data cable end connector receptors that accept the type of data cable end connector used, which can include ethernet, token ring, coaxial, optical fiber, serial cable, Cat2, telephone cable, universal serial bus (USB) cable, or other data cable type used for sending digital information. Alternatively, the data cable can be specific to the communication of video information, in which case the types of data cables can include s-video, component video, DVI, HDMI, display port, CoaX-Press, and MHL, and other video cable types. In a second example, a non-permanent, optional, external connection can be constructed between the payment interface device 300, or the peripheral device 301, using a wireless connection. In this example, the connected devices have modems with wireless transceivers that operate and connect using standards and protocols as described above, in which the modem can be one of the accessories 308. In a third example, a non-permanent, optional, external connection can be constructed between the payment interface device 300 and the peripheral device 301 using a communicative connection 310. The communicative connection 310 can be constructed between the accessory hubs 309 of the respective devices, using either of the data cable or wireless methods described previously. With reference back to FIG. 2, communicative connection 310 can be provided by wire routed below the countertop on which the kiosk system is provided.

In some embodiments, the payment interface device 300 and the peripheral device 301 can have specific accessories 308, and can make use of one or more communicative connections 310, to facilitate an efficient and secure commercial transaction through the use of the accessories 308 and communicative connections 310. In one example, the touch screen display 303 can be used to provide a customer with access to a payment flow interface, instantiated by the applications microprocessor 302 operating system, that can provide any type of customer-relevant commercial transaction information, commands, or prompts to the customer, such as guiding the customer through the necessary commercial transaction steps and providing the customer with a prompt for payment information. The customer can use the payment interface 305 in response to the prompt for payment information to make a payment using a compatible method, such as credit card, NFC, and others described previously. In another example building upon the configuration of the previous example, a communicative connection 310 can be established with the peripheral device 301 through the accessory hubs 309 of both devices, enabling the applications microprocessor 302 operating system to implement a multi-window display scheme. The multi-window display scheme can further provide access to a purchase order interface by displaying, on touch screen display 304 of the peripheral device 301, a set of purchase order interface screens to the customer. The purchase order interface can provide any type of relevant commercial transaction information, commands, or prompts, such as a prompt for adding or removing items from the purchase order. The utilization of the touch screen display 304 by the applications microprocessor 302 through the accessory hub 309 of the peripheral device 301 renders the touch screen display 304 a specific species device in the genus of accessories 308 devices. In another example, the communicative connection 310 can be established between other types of devices, such as a printer device, to the accessory hubs 309 of the payment interface device 300 or of the peripheral device 301. Through the communicative connections 310, the applications microprocessor 302 can send commands to, provide prompts to, receive inputs from, and provide user interfaces to the displays of, the other types of devices, in addition to any other type of control afforded by the capabilities of the applications microprocessor 302. As illustrated, the applications microprocessor 302 could also have a more direct connection to provide display information to the touch screen display 304 that bypasses accessory hub 309. A specific example in which communicative connection 310 includes both communication pathways is disclosed below with reference to FIG. 4. In specific embodiments, the operating system can utilize MultiWindowMode commands to control the dimensions, pixel resolution, orientation, and other characteristics of the system interfaces to display properly on the displays.

Figure 4:
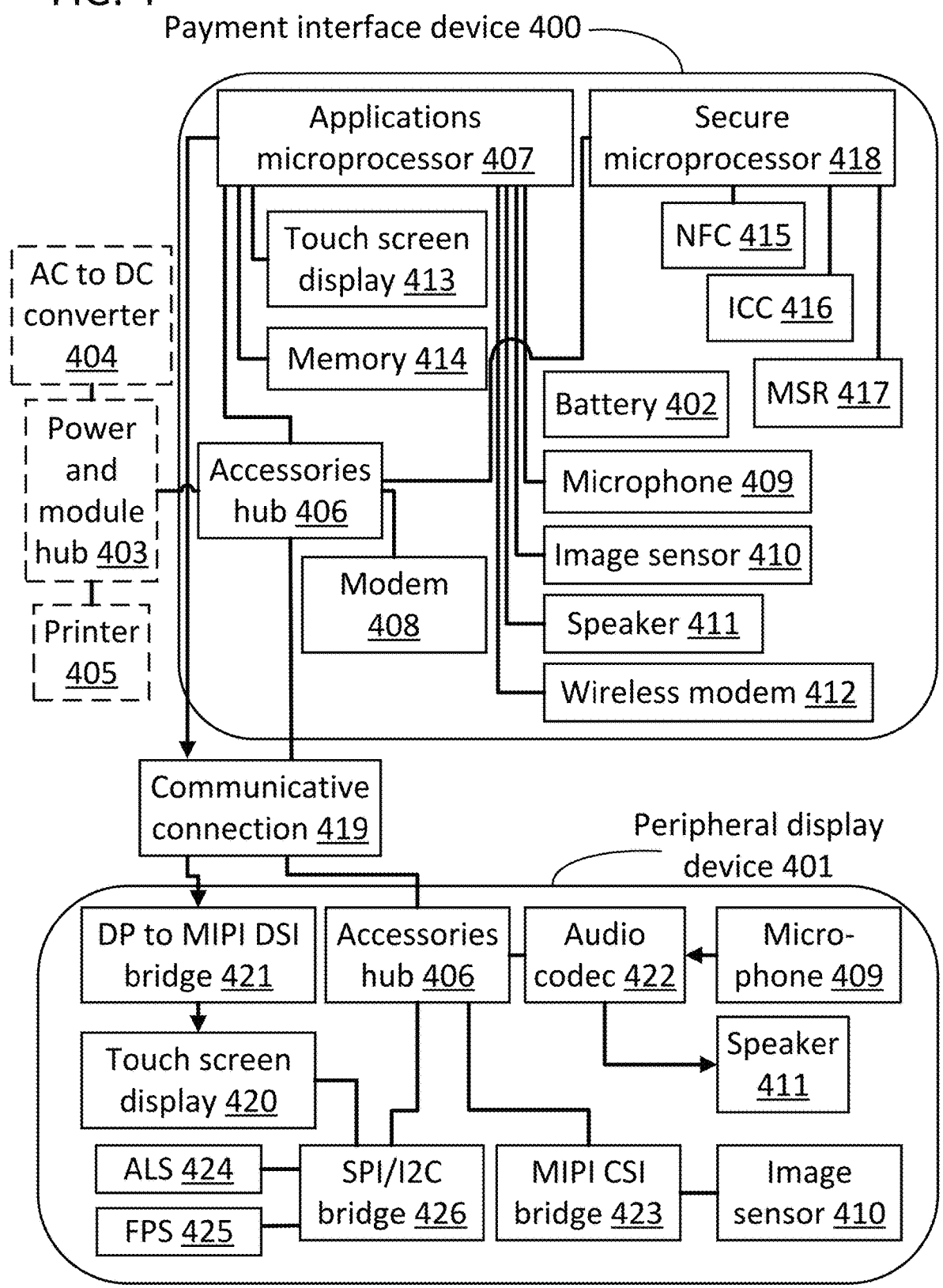
FIG. 4 illustrates a detailed block diagram of a payment interface device operating in combination with a more complex peripheral display in accordance with specific embodiments of the invention disclosed herein.

FIG. 4 illustrates the configuration of hardware modules on a payment interface device 400 and a peripheral display device 401 that is in accordance with systems and methods disclosed herein. In this figure, solid lines without arrows that connect two blocks indicate a direct and two-way communicative connection between those blocks, while solid lines with arrows that connect two blocks indicate a direct, communicative connection in the direction of the arrows. Additionally, rectangular blocks with solid borders indicate hardware modules and rectangular blocks with broken borders indicate hardware that is supplemental to, but not part of, the main system. Data, digital files, and device information can travel along the block connections and through the illustrated blocks.

In some embodiments, the payment interface device 400 can be used in a cordless configuration while powered by a battery 402. Alternatively, the payment interface device 400 can be powered by a power and module hub 403 connected to an alternating current (AC) to direct current (DC) converter 404 that is plugged into a standard wall electricity outlet. The battery 402 can be charged while the payment interface device 400 is powered by the power and module hub 403. The payment interface device 400 can print on paper media to produce documents, such as commercial transaction receipts, using a printer 405 that is connected to the payment interface device 400 through the power and module hub 403. The power and module hub 403 can connect to the payment interface device 400 using an on-board accessories hub 406, through which commands can be sent from the applications microprocessor 407 to peripheral devices, such as the printer 405 and the peripheral display device 401, or to other internal hardware modules, such as a modem 408. In some embodiments, the payment interface device 400 has internal hardware modules that can enable features such as speech recognition through a microphone 409, image capture, video capture, and facial recognition with an image sensor 410, audio playback through a speaker 411, and wireless communication by a wireless modem 412, all of which can be connected directly to the applications microprocessor 407. In the embodiments above, the listed hardware modules can comprise any make, model, or type of device commonly used in mobile applications. For example, the battery 402 can be a lithium-ion battery, the accessories hub 406 can be configured to interface with other devices using USB connection standards, and the applications microprocessor 407 can be a Qualcomm Snapdragon microprocessor.

In some embodiments, a system comprising a payment interface device 400 with a touch screen display 413 and a memory 414 can operate in a first mode of operation where a user can use the payment interface device 400 to carry out a commercial transaction. The touch screen display 413 can be of any size, wherein a display 413 with a diagonal length of fourteen inches can be ideal for managing both the provided information and the information input tools. The memory 414 serves the applications microprocessor 407 in storing an operating system and programming needed to run the payment interface device 400 with connected peripheral devices. In one example the applications microprocessor 407 can provide access to a payment flow interface on the touch screen display 413, wherein a customer uses the interface to provide payment information and conduct a purchase transaction. When payment information must be provided to the system, the customer can use any of the payment interfaces on the payment interface device 400, which can be, for example, a near field communications (NFC) interface 415, an integrated circuit card (ICC) interface 416, and a magnetic stripe reader (MSR) 417. Payment information provided by the methods and interfaces described here can be transferred to a secure microprocessor 418 for payment completion, wherein the unsecured applications microprocessor 407 does not gain access to unencrypted payment data and the secure microprocessor 418 has access to network resources of the modem 408 via the accessories hub 406. In one example, the secure microprocessor 418 can be a Broadcom StrataGX device, or any other cryptographically secure processor or microcontroller.

The connection between touch screen display 413 and applications microprocessor 407 can be a two directional connection between two dedicated ports on applications microprocessor 407 with one port being a dedicated touch controller input port and another port being a dedicated display port. Additionally, control of the peripheral display device 401 can be accomplished with the communicative connection 419 comprising two separate wires. The first wire can be used by a unidirectional connection from the applications microprocessor 407 directly to the touch screen display 420. The wire can be a display peripheral wire. This connection can transition through a display port (DP) and mobile industry processor interface (MIPI) display serial interface (DSI) bridge 421 that sends a purchase order interface. In other embodiments where touch screen display 420 is DP compatible, bridge 421 can be removed. The second wire can be used by a bi-directional connection from the applications microprocessor 407 to the remaining peripheral display device 401 hardware modules by way of the accessories hub 406 on both devices 400 and 401. The wire can be a USB cord. Touch data from touch screen display 420 can be routed back to applications microprocessor 407 via bridge 426 and the accessory hubs 406 in order for the purchase order inputs to the system interface to affect the transaction.

Audio information can be provided using the speaker 411 on the peripheral display device 401. Data sent to this end can be processed through an audio codec 422 to be converted to a format usable by the speaker 411. Audio data to be received by the applications microprocessor 407 from the peripheral display device 401, such as voice commands, can originate from the microphone 409 thereon and be formatted by the audio codec 422 for sending to the accessories hub 406.

The peripheral display device 401 can include an image sensor 410 for image capture, video capture, and facial recognition, for example to unlock the device with a cleared facial recognition identity, with a MIPI camera serial interface (CSI) to USB bridge 423 for image data conversion when sending image data to the applications microprocessor 407.

The peripheral display device 401 can be equipped with an ambient light sensor (ALS) 424 for automatic screen brightness adjustment to facilitate power saving and ergonomic viewing, as well as a security finger print scanner (FPS) 425. The ALS 424 and the FPS 425 can be put in communication with the accessories hub 406 on the peripheral display device 401 by a serial peripheral interface (SPI)/inter-integrated circuit (I2C) to USB bridge 426.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, throughout the disclosure the example of a kiosk with a bar code scanner for scanning physical items was used as an example of a self-service checkout kiosk. However, the approaches disclosed herein are broadly applicable to any self-service kiosk used for a monetary transaction including those used for the purchase of goods or services, those built into gasoline pumps or other self-serve purchase locations, those used for buying a transit or event entry ticket, those used for buying a parking or toll pass, or those used for sending or receiving money from a networked source or sink of funds. As another example, throughout the disclosure the example of using a peripheral display device to generate a purchase order was used. However, the applications processor disclosed herein can provide any number of interfaces to a peripheral display device as needed including advertisements, debugging information for operating on payment processing devices with limited display technology, and any other information that may need to be displayed to a customer or owner of the kiosk. The method steps discussed above can be conducted by a processor operating with a computer-readable non-transitory medium storing instructions for those method steps. The computer-readable medium may be one or more memories within a payment interface device or other element of a kiosk system or accessible to the kiosk system via a network. The payment interface device can be a terminal, a smartphone, a point of sale terminal, a tablet, or any other device that has a means for securely receiving payment information. The peripheral display device can be a terminal, a smartphone, a point of sale terminal, a tablet, or any other device that has a display and can be communicatively connected to the payment interface device. These and other modifications and variations to the present invention may be practiced by those skilled in the art, without departing from the scope of the present invention, which is more particularly set forth in the appended claims.

What is claimed is:
1. A system, comprising:
an external display;
a peripheral bar code scanner;
a payment interface device having a casing, an integrated touch display, and an integrated card reader;
a secure microprocessor located within the casing, wherein the secure microprocessor processes payment information for the system as transferred from at least one of the integrated card reader and integrated touch display to the secure microprocessor; and
an applications microprocessor located within the casing, wherein the applications microprocessor is in operative communication with: (i) the secure microprocessor, (ii) the peripheral bar code scanner, (iii) the external display, and (iv) the integrated touch display;
wherein:
the integrated touch display and the integrated card reader are integrated with the casing of the payment interface device;
the external display is connected to the payment interface device via at least one communication port; and
the applications microprocessor separately controls:

(i) the external display via the at least one communication port; and
(ii) the integrated touch display via routing internal to the payment interface device.

2. The system of claim 1, wherein:
the applications microprocessor controls the integrated touch display using a first display module; and
the applications microprocessor controls the external display using a second display module.

3. The system of claim 2, wherein:
the applications microprocessor controls the external display using a Presentation dialog.

4. The system of claim 1, further comprising:
a touch controller;
wherein the touch controller has a communicative connection to the secure microprocessor; and
wherein the communicative connection does not connect to the applications microprocessor.

5. The system of claim 1, further comprising:
a non-transitory computer readable medium located in the casing;
wherein the non-transitory computer readable medium stores instructions, for execution on the applications microprocessor, to:
identify an item using information received from the peripheral bar code scanner;
display an item identification on the external display; and
display a set of payment flow user interface screens on the integrated touch display.

6. The system of claim 5, wherein the non-transitory computer readable medium further stores instructions to: (i) display a PIN pad on the integrated touch display; and (ii) alter a mode of the system to directly route touch coordinates from the integrated touch display to the secure microprocessor when the PIN pad is displayed.

7. The system of claim 6, wherein:
the applications microprocessor displays the PIN pad using a first display module; and
the applications microprocessor displays the item identification using a second display module and a Presentation dialog.

8. The system of claim 1, wherein:
the payment interface device has a countertop form factor;
the casing is part of the countertop form factor; and
a top down footprint of the countertop form factor is less than one square foot.

9. A payment interface device, comprising:
an integrated touch display;
a card reader;
a casing;
at least one communication port;
a secure microprocessor located within the casing, wherein the secure microprocessor executes instructions to process payment information received by at least one of the card reader and integrated touch display; and
an applications microprocessor located within the casing, wherein the applications microprocessor executes instructions for operative communication with: (i) the secure microprocessor, (ii) a peripheral bar code scanner, (iii) an external display, and (iv) the integrated touch display;
wherein:
the integrated touch display and the card reader are integrated with the casing of the payment interface device;

the payment interface device is connected to the external display via the at least one communication port; and
an operating system of the payment interface device separately controls:
(i) the external display via the at least one communication port; and
(ii) the integrated touch display via routing internal to the payment interface device.

10. The device of claim 9, wherein:
the applications microprocessor controls the integrated touch display using a first display module; and
the applications microprocessor controls the external display using a second display module.

11. The device of claim 10, wherein:
the applications microprocessor controls the external display using a Presentation dialog.

12. The device of claim 9, further comprising:
a touch controller located in the casing;
wherein the touch controller has a communicative connection to the secure microprocessor; and
wherein the communicative connection does not connect to the applications microprocessor.

13. The device of claim 9, further comprising:
a non-transitory computer readable medium located in the casing;
wherein the non-transitory computer readable medium stores instructions, for execution using the applications microprocessor, to:
identify an item using information from the peripheral bar code scanner;
display an item identification on the external display; and
display a set of payment flow user interface screens on the integrated touch display.

14. The device of claim 13, wherein the non-transitory computer readable medium further stores instructions to: (i) display a PIN pad on the integrated touch display; and (ii) alter a mode of the device to directly route touch coordinates from the integrated touch display to the secure microprocessor when the PIN pad is displayed.

15. The device of claim 14, wherein:
the applications microprocessor displays the PIN pad using a first display module; and
the applications microprocessor displays the item identification using a second display module and a Presentation dialog.

16. The device of claim 9, wherein:
the device has a countertop form factor;
the casing is part of the countertop form factor; and
a top down footprint of the countertop form factor is less than one square foot.

17. A payment interface device, comprising:
an integrated touch display;
an integrated card reader;
a casing;
an applications microprocessor located within the casing, wherein the applications microprocessor executes instructions for operative communication with: (i) a secure microprocessor, (ii) a peripheral bar code scanner, (iii) an external display, and (iv) the integrated touch display; and
wherein:
the integrated touch display and the integrated card reader are integrated with the casing of the payment interface device;
the external display is connected to the payment interface device via at least one communication port; and
the applications microprocessor separately controls:

(i) the external display via the at least one communication port; and
(ii) the integrated touch display via routing internal to the payment interface device.

18. The device of claim 17, wherein:
the applications microprocessor controls the external display using a Presentation dialog.

19. The device of claim 17, further comprising:
a touch controller located in the casing;
wherein the touch controller has a communicative connection to the secure microprocessor and the integrated touch display; and
wherein the communicative connection does not connect to the applications microprocessor.

20. The device of claim 17, further comprising:
a non-transitory computer readable medium located in the casing;
wherein the non-transitory computer readable medium stores instructions, for execution on the applications microprocessor, to:
identify an item using information received from the peripheral bar code scanner;
display an item identification on the external display; and
display a set of payment flow user interface screens on the integrated touch display.

21. The device of claim 17, wherein:
the device has a countertop form factor;
the casing is part of the countertop form factor; and
a top down footprint of the countertop form factor is less than one square foot.

22. The system of claim 1, wherein the at least one communication port is an antenna.

23. The device of claim 9, wherein the at least one communication port is an antenna.

24. The device of claim 17, wherein the at least one communication port is an antenna.

* * * * *